United States Patent
Lines et al.

(10) Patent No.: US 6,797,091 B2
(45) Date of Patent: Sep. 28, 2004

(54) METHOD FOR EMBOSSING EXPANDED GRAPHITE SHEET MATERIAL UNDER REDUCED PRESSURE

(75) Inventors: Donald A. Lines, Vancouver (CA); Nicholas A. Fletcher, Vancouver (CA); Eric G. Pow, Vancouver (CA); Michael Sexsmith, North Vancouver (CA); Bill Gray, Richmond (CA); Horst Thumm, North Vancouver (CA)

(73) Assignee: Ballard Power Systems Inc., Burnaby (CA)

( * ) Notice: Subject to any disclaimer, the term of this patent is extended or adjusted under 35 U.S.C. 154(b) by 350 days.

(21) Appl. No.: 09/747,571

(22) Filed: Dec. 22, 2000

(65) Prior Publication Data

US 2001/0039701 A1 Nov. 15, 2001

Related U.S. Application Data

(63) Continuation-in-part of application No. 09/569,710, filed on May 10, 2000, now abandoned.

(51) Int. Cl.⁷ .................. B32B 31/22; B32B 31/18; B32B 31/16; B29C 59/02; B29C 43/56

(52) U.S. Cl. ............... 156/87; 156/209; 156/219; 156/252; 156/285; 156/286; 264/85; 264/102; 264/154; 264/155; 264/284; 264/293

(58) Field of Search ............... 264/85, 102, 154, 264/155, 284, 293; 156/87, 209, 219, 285, 286, 252

(56) References Cited

U.S. PATENT DOCUMENTS

| | | | |
|---|---|---|---|
| 3,795,471 A | 3/1974 | Milani | 425/388 |
| 4,395,299 A * | 7/1983 | Riggs et al. | 156/285 |
| 4,534,922 A | 8/1985 | Atkinson et al. | 264/119 |
| 4,676,515 A * | 6/1987 | Cobb | 277/592 |
| 4,752,518 A | 6/1988 | Lohrke et al. | 428/131 |
| 4,988,583 A | 1/1991 | Watkins et al. | 429/30 |
| 5,039,371 A | 8/1991 | Cremens et al. | 156/382 |
| 5,122,318 A * | 6/1992 | Bonet et al. | 264/85 |
| 5,300,370 A | 4/1994 | Washington et al. | 429/34 |
| 5,313,325 A | 5/1994 | Lauf et al. | 359/614 |
| 5,521,018 A | 5/1996 | Wilkinson et al. | 42/26 |
| 5,527,363 A | 6/1996 | Wilkinson et al. | 29/623 |
| 5,570,501 A * | 11/1996 | Atkinson et al. | 29/527.2 |
| 5,584,240 A | 12/1996 | Doi et al. | 101/32 |
| 5,885,728 A | 3/1999 | Mercuri et al. | 429/30 |
| 6,037,074 A | 3/2000 | Mercuri et al. | 429/34 |
| 6,454,978 B1 * | 9/2002 | Thielman | 264/104 |
| 2002/0180088 A1 * | 12/2002 | Hashiguchi et al. | 264/102 |
| 2003/0051797 A1 * | 3/2003 | Lines et al. | 156/209 |
| 2003/0107147 A1 * | 6/2003 | Thielman et al. | 264/104 |

FOREIGN PATENT DOCUMENTS

| | | |
|---|---|---|
| GB | 758036 | 9/1956 |
| GB | 2269332 | 2/1994 |
| JP | 60-012672 | 1/1985 |
| JP | 60-65781 | 4/1985 |
| JP | 61-007570 | 1/1986 |
| JP | 61-007571 | 1/1986 |
| JP | 09-117964 | 5/1997 |
| JP | 10040937 | 2/1998 |
| JP | 10-125337 | 5/1998 |
| JP | 2000223133 | 8/2000 |

OTHER PUBLICATIONS

English machine translation of JP–10–040937 A, 2003, Japanese Patent Office website.*

* cited by examiner

Primary Examiner—Michael Colaianni
Assistant Examiner—Michael I. Poe
(74) Attorney, Agent, or Firm—McAndrews, Held & Malloy, Ltd.

(57) ABSTRACT

An improved method for embossing expanded graphite sheet material including removing at least a portion of the gas from within the material by exposing the material to a pressure less than atmospheric pressure, and then embossing the material.

20 Claims, 10 Drawing Sheets

METHOD FOR EMBOSSING EXPANDED GRAPHITE SHEET MATERIAL UNDER REDUCED PRESSURE

CROSS-REFERENCE TO RELATED APPLICATION(S)

This application is a continuation-in-part of U.S. patent application Ser. No. 09/569,710 filed May 10, 2000, now abandoned entitled "Method and Apparatus for Embossing Expanded Graphite Sheet Material under Reduced Pressure". The '710 application hereby incorporated by reference in its entirety.

FIELD OF THE INVENTION

The present invention relates to methods and apparatus for embossing expanded graphite sheet material under vacuum.

BACKGROUND OF THE INVENTION

Electrochemical fuel cells convert reactants, namely fuel and oxidants, to generate electric power and reaction products. Electrochemical fuel cells generally employ an electrolyte disposed between two electrodes, namely a cathode and an anode. The electrodes both comprise an electrocatalyst disposed at the interface between the electrolyte and the electrodes to induce the desired electrochemical reactions. The fuel fluid stream which is supplied to the anode may be a gas such as, for example, substantially pure hydrogen or a reformate stream comprising hydrogen. Alternatively, a liquid fuel stream such as, for example, aqueous methanol may be used. The oxidant fluid stream, which is supplied to the cathode, typically comprises oxygen, such as substantially pure oxygen, or a dilute oxygen stream such as air.

Solid polymer fuel cells employ a solid polymer electrolyte, otherwise referred to as an ion exchange membrane. The membrane is typically interposed between two electrode layers, forming a membrane electrode assembly ("MEA"). While the membrane is typically selectively proton conductive, it also acts as a barrier, isolating the fuel and oxidant streams from each other on opposite sides of the MEA. The MEA is typically disposed between two plates to form a fuel cell assembly. The plates act as current collectors and provide support for the adjacent electrodes. The assembly is typically compressed to facilitate good electrical contact between the plates and the electrodes, and to facilitate adequate sealing between fuel cell components. A plurality of fuel cell assemblies may be combined in series or in parallel to form a fuel cell stack. In a fuel cell stack, a plate may be shared between two adjacent fuel cell assemblies, in which case the plate also serves as a separator to fluidly isolate the fluid streams of the two adjacent fuel cell assemblies.

Fuel cell plates known as fluid flow field plates have open-faced channels formed in one or both opposing major surfaces for directing reactants and/or coolant fluids to specific portions of such major surfaces. The open-faced channels also provide passages for the removal of reaction products, depleted reactant streams, and/or heated coolant streams. For an illustration of a fluid flow field plate, see, for example, U.S. Pat. No. 4,988,583, issued Jan. 29, 1991. Where the major surface of a fluid flow field plate faces an MEA, the open-faced channels typically direct a reactant across substantially all of the electrochemically active area of the adjacent MEA. Where the major surface of a fluid flow field plate faces another fluid flow field plate, the channels formed by their cooperating surfaces may be used for carrying coolant for controlling the temperature of the fuel cell.

Conventional methods of fabricating fluid flow field plates require the engraving or milling of flow channels into the surface of rigid plates formed of graphitized carbon-resin composites. These methods of fabrication place significant restrictions on the minimum achievable cell thickness due to the machining process, plate permeability, and required mechanical properties. Further, such plates are expensive, both in raw material costs and in machining costs. The machining of channels and the like into the graphite plate surfaces causes significant tool wear and requires significant processing times.

Alternatively, fluid flow field plates can be made by a lamination process, as described in U.S. Pat. No. 5,300,370, issued Apr. 5, 1994, wherein an electrically conductive, fluid impermeable separator layer and an electrically conductive stencil layer are consolidated to form at least one open-faced channel. Such laminated fluid flow field assemblies tend to have higher manufacturing costs than single-layer plates, due to the number of manufacturing steps associated with forming and consolidating the separate layers.

Alternatively, fluid flow field plates can be made from an electrically conductive, substantially fluid impermeable material that is sufficiently compressible or moldable so as to permit embossing. Expanded graphite sheet is generally suitable for this purpose because it is relatively impervious to typical fuel cell reactants and coolants and thus is capable of fluidly isolating the fuel, oxidant, and coolant fluid streams from each other; it is also compressible and embossing processes may be used to form channels in one or both major surfaces. For example, U.S. Pat. No. 5,527,363, issued Jun. 18, 1996, describes fluid flow field plates comprising a metal foil or sheet interposed between two expanded graphite sheets having flow channels embossed on a major surface thereof.

However, embossing expanded graphite sheet material can be problematic. During the embossing process, gas (for example, air) that would be advantageously liberated on compression may become trapped within the sheet material, potentially leading to delamination and/or blistering of the embossed material. In some applications, such as fluid flow field plates in a fuel cell, for example, delamination and/or blistering of expanded graphite sheet plates is undesirable. For example, delamination and/or blistering may weaken the plate and may make it more fluid permeable. The plate material is also rendered less homogeneous as a result, and may exhibit undesirable localized differences in conductivity. Delamination and/or blistering can also cause surface defects that may affect the flow channels on the plate. Further, the foregoing problems may be difficult to detect during fabrication and may only surface at a later date. Finally, in applications where the embossed plate is subsequently impregnated with a resin, delamination and/or blistering may result in voids in the plate material that become filled with resin. Where the resin employed is nonconductive, this may result in undesirable nonconductive regions dispersed within the plate.

SUMMARY OF THE INVENTION

An improved method of embossing expanded graphite sheet material comprises removing at least a portion of the gas from within the material by exposing the material to a pressure less than atmospheric pressure, and then embossing the material. For example, the material may be embossed in an embossing atmosphere at a reduced pressure less than atmospheric pressure and maintaining a reduced pressure at least during the embossing step. Preferably, the pressure to which the expanded graphite sheet material is exposed is less than or equal to about 400 torr. More preferably, the pressure is less than 350 torr, more preferably less than 170 torr, and more preferably still, less than 50 torr. The embossing atmosphere may comprise an inert gas, such as nitrogen, helium and argon, for example. The method may further comprise continuing to evacuate gases from the embossing atmosphere during the embossing step.

The expanded graphite sheet material may comprise a plurality of sheet materials comprising at least one expanded graphite sheet, and the method may further comprise laminating the plurality of sheet materials during the embossing step. The plurality of sheet materials may comprise at least one sheet of metal foil.

An improved apparatus for embossing expanded graphite sheet material at a pressure less than atmospheric pressure comprises:

(a) at least one embossing device;
(b) at least one compression device adapted to urge the embossing device against the material;
(c) an embossing chamber comprising the at least one embossing device and adapted to receive the material, and to be substantially gas-tight at least when the embossing device is urged against the material by the pressing device; and
(d) an evacuation device for reducing the pressure within the embossing chamber.

The at least one embossing device may consist of plate dies or roller dies, and the at least one pressing device may consist of press platens or rollers. The apparatus may further comprise at least one sealing member associated with the embossing chamber for maintaining the gas-tight seal therein. The sealing member may comprise at least one O-ring, bellows, compressible seal or inflatable bladder. Preferably, the evacuation device is capable of reducing the pressure within the embossing chamber to less than or equal to about 400 torr. More preferably, the evacuation device is capable of reducing the pressure within the embossing chamber to less than 350 torr, more preferably less than 170 torr, and more preferably still, less than 50 torr.

The apparatus may further comprise an inert gas source fluidly connectable to the embossing chamber. The inert gas may be selected from the group consisting of nitrogen, helium and argon.

Another improved apparatus for embossing expanded graphite sheet material comprises:

(a) a chamber adapted to receive the material and to maintain a reduced pressure less than atmospheric pressure at least when the material is in the chamber;
(b) an evacuation mechanism for reducing the pressure within the embossing chamber; and
(c) at least one roller die associated with the chamber for receiving the material from the chamber.

In one embodiment, the chamber of the apparatus comprises at least one resilient member extending from an interior surface of the chamber and adapted to contact the material. For example, the chamber may comprise an upper portion and a lower portion, the upper portion comprising a plurality of resilient sealing members extending downwardly therefrom, and the lower portion comprising a plurality of resilient sealing members extending upwardly therefrom, both sets of sealing members being adapted to contact the material.

The foregoing embodiment may further comprise at least one feed roller for directing the material to the chamber. The feed roller may be a pin roller, for example.

In another embodiment, the chamber of the apparatus comprises at least two rollers adapted to contact a major surface of the material, such that a substantially gas-tight seal is formed between each of the rollers and the surface of the material. The chamber may comprise at least two pair of opposed rollers; each of the pairs of opposed rollers adapted to contact opposing major surfaces of the material. At least one of the rollers may be the roller die(s) associated with the apparatus.

The embodiment of the apparatus may further comprise at least one sealing member associated with the chamber for maintaining a gas-tight seal therein. The sealing member may comprise, for example, a sealing member disposed at each end of the roller(s), a resilient member adapted to contact the cylindrical surface of the roller(s), or both.

The roller(s) may be driven, or the apparatus may further comprise at least one feed roller, such as a pin roller, for directing the material to the chamber.

BRIEF DESCRIPTION OF THE DRAWINGS

FIG. 7d is a side view of two embodiments of seals that may be incorporated into the apparatus of FIG. 7a.

DETAILED DESCRIPTION OF PREFERRED EMBODIMENTS(S)

As used in this description and in the appended claims, "expanded graphite sheet material" means sheet materials comprising expanded graphite, including composites thereof such as, for example, the composite described in U.S. Pat. No. 5,885,728, issued Mar. 23, 1999. "Expanded graphite sheet material" also includes laminates that include one or more layers comprising expanded graphite.

As mentioned previously, when embossing expanded graphite sheet material, gas that would be advantageously liberated on compression may become trapped within the sheet material, potentially leading to undesirable delamination and/or blistering of the embossed sheet. Without being restricted by any theory, it is thought that gas is trapped as a result of the anisotropy of the sheet material. Gases (fluids, generally) tends to flow readily within expanded graphite sheet material in directions parallel to the opposed parallel planar surfaces of the sheet and the planes of the constituent graphite particles thereof. However, the surface layers of expanded graphite sheet material, due to the alignment of the exfoliated graphite particles and the constituent layers of atoms parallel thereto, tend to resist fluid flow in the "z direction", that is, in directions orthogonal to the opposed parallel planar surfaces of the sheet. Thus, during embossing, gases tend not to flow out of the sheet material in the z direction, flowing instead out of the edges. This can result in gas being trapped within the expanded graphite sheet material during embossing. Removing at least a portion of the gas within the expanded graphite sheet material prior to, or concurrently with, embossing it may reduce or prevent blistering or delamination in the final embossed product. One way of removing at least a portion of the gas within the expanded graphite sheet is to emboss it at a pressure less than atmospheric pressure.

Figure 1:
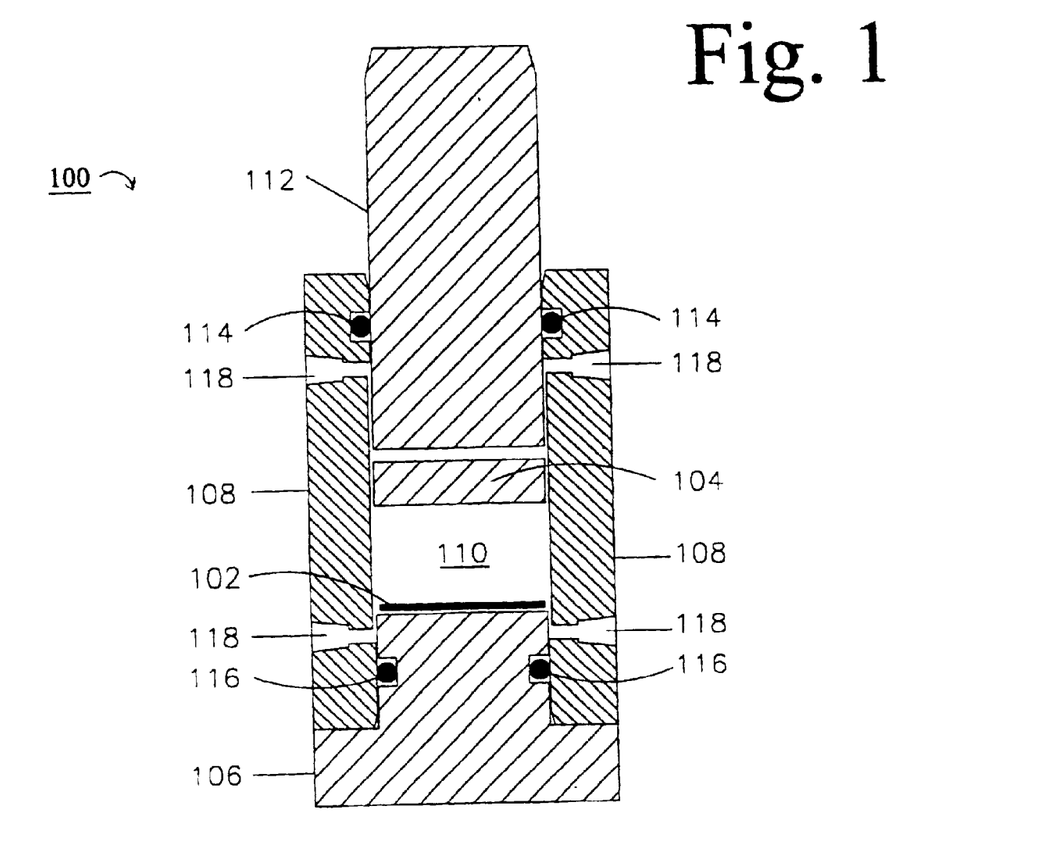
FIG. 1 is a partially exploded cross-sectional view of one embodiment of the present embossing apparatus.

FIG. 1 is a partially exploded cross sectional view of one embodiment of the present embossing apparatus. In embossing apparatus 100, expanded graphite sheet 102 is placed between die 104 and backing plate 106. Sleeve 108 is adapted to receive backing plate 106 and die 104. Alternatively, backing plate and sleeve 108 could be a unitary structure. Cooperating surfaces of sleeve 108, backing plate 106, and die 104 define embossing chamber 110. Sleeve 108 is also adapted to receive piston 112 and die 104 is removably attached thereto (shown detached in FIG. 1).

In operation, expanded graphite sheet 102 rests on backing plate 106 and piston 112 urges die 104 towards sheet 102. O-rings 114 and 116 form a substantially gas-tight seal between sleeve 108 and piston 112 and backing plate 106, respectively. At least a portion of the air (or other gas) within embossing chamber 110 is withdrawn via multiple ports 118 distributed around the perimeter of apparatus 100 by a pump (not shown), thereby reducing the pressure in embossing chamber 110 below atmospheric pressure. Piston 112 is then further urged towards backing plate 106, bringing die 104 in contact with expanded graphite sheet 102 and embossing it. Reduced pressure within embossing chamber 110 is maintained during the embossing process. Once embossing is complete the pressure within embossing chamber 110 is allowed to return to atmospheric pressure, piston 112 is disengaged from sleeve 108, and the embossed expanded graphite sheet can be removed.

Figure 2A:
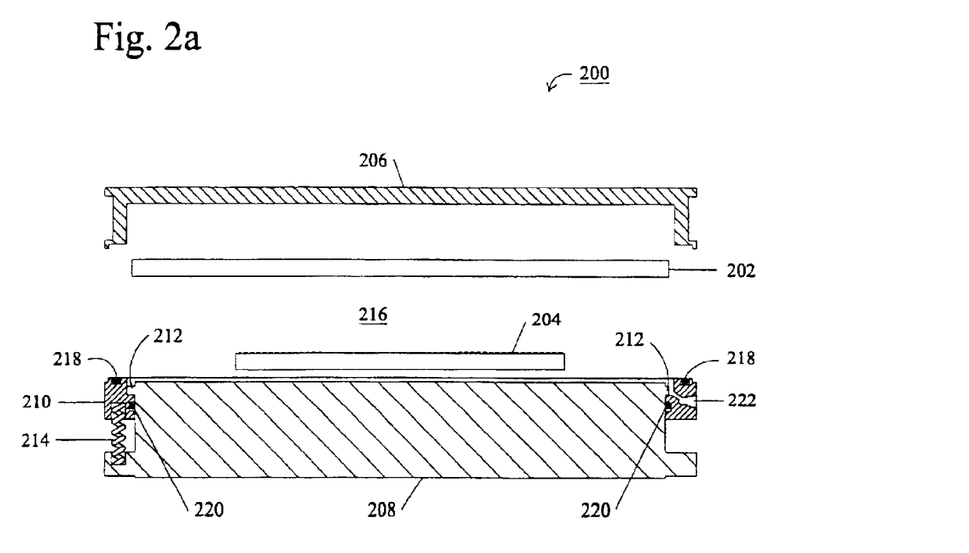
FIGS. 2a and 2b are partially exploded cross-sectional views of another embodiment of the present apparatus.
Figure 2B:
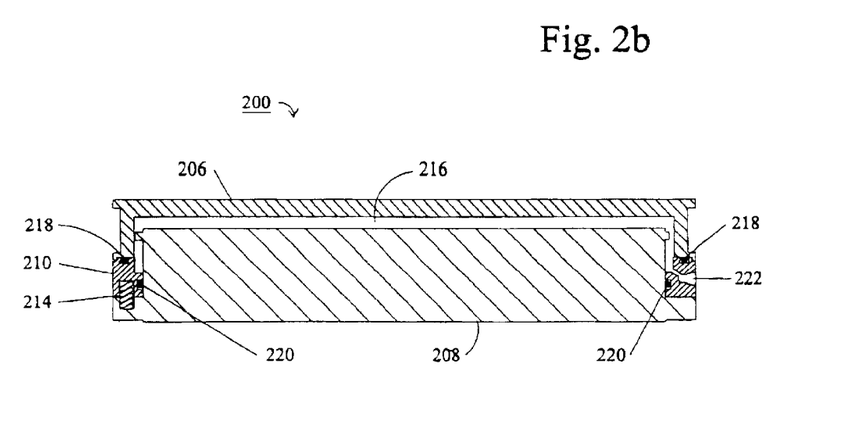

FIGS. 2a and 2b are partially exploded cross sectional views of another embodiment of the present apparatus. In embossing apparatus 200, an expanded graphite sheet (not shown) is placed between backing plate 202 and die 204. Cover plate 206 and piston 208 are adapted to receive backing plate 202 and die 204, respectively. Cover plate 206 is adapted to receive piston 208 and to matingly contact sleeve 210, as best shown in FIG. 2b (for clarity, backing plate 202 and die 204 are omitted from FIG. 2b). In the open position, sleeve 210 is held against rim 212 of piston 108 by spring 214, as best shown in FIG. 2a. Cooperating surfaces of piston 208, cover plate 206 and sleeve 210 define embossing chamber 216.

In operation, mating surfaces of cover plate 206 and sleeve 210 are urged together and contact. O-ring 218 forms a substantially gas-tight seal therebetween. As piston 208 is further urged towards cover plate 206, cover plate 206 forces sleeve 210 to slide down piston 208 and compress spring 214. The compression of spring 214 assists in maintaining the substantially gas-tight seal formed by O-ring 218. O-ring 220 maintains a substantially gas-tight seal between sleeve 210 and piston 208. At least a portion of the air (or other gas) within embossing chamber 216 is withdrawn via port 222 by a pump (not shown), thereby reducing the pressure in embossing chamber 216 below atmospheric pressure. Piston 208 is then further urged towards backing plate 202, bringing die 204 in contact with the expanded graphite sheet and embossing it. Reduced pressure within embossing chamber 216 is maintained during the embossing process. Once embossing is complete the pressure within embossing chamber 216 is allowed to return to atmospheric pressure, piston 208 is disengaged from sleeve 210, and the embossed expanded graphite sheet can be removed.

As described in the foregoing embodiments, the embossed expanded graphite sheet will have raised features on one major surface only. If it is desired to emboss features on both sides of the expanded graphite sheet, embossing apparatus 100 could include another die associated with backing plate 106, or backing plate 202 in apparatus 200 could be replaced by another die. The sheet material could also be die cut at the same time that it is embossed.

Figure 3:
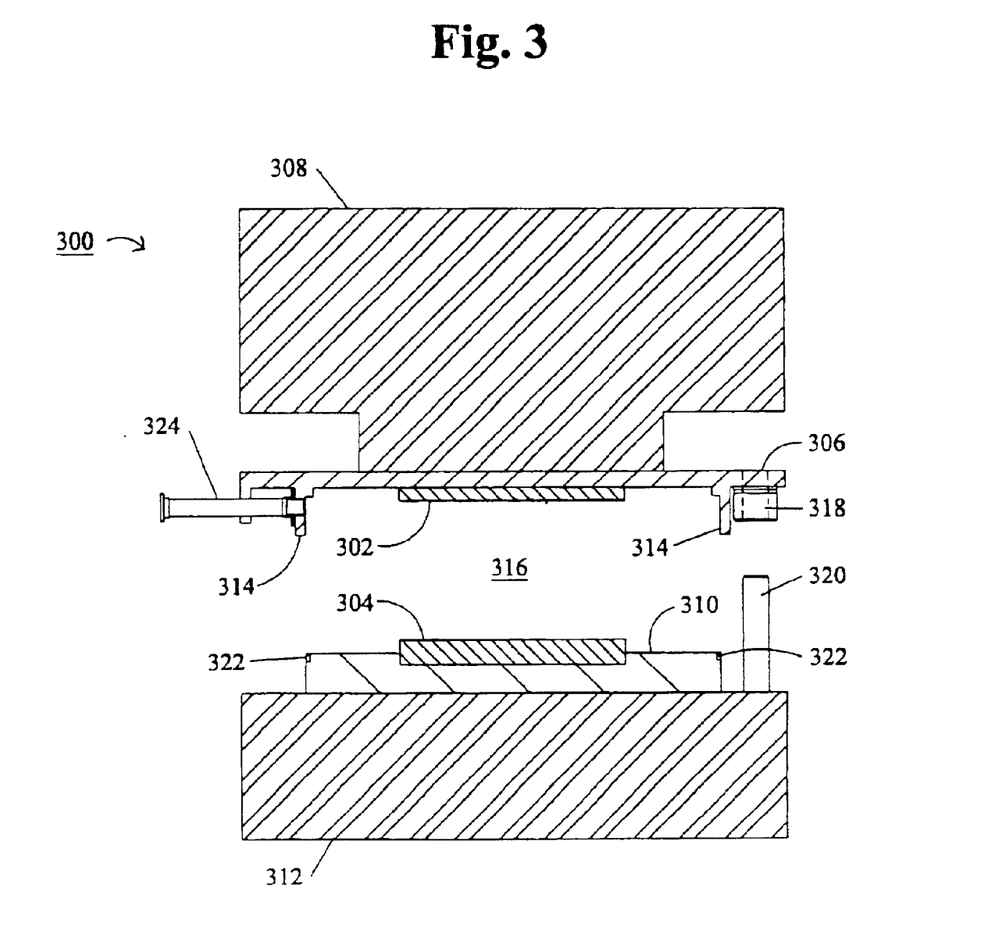
FIG. 3 is a cross-sectional view of a yet another embodiment of the present embossing apparatus.

FIG. 3 is a cross-sectional view of a yet another embodiment of the present embossing apparatus. In embossing apparatus 300, an expanded graphite sheet (not shown) is placed between dies 302 and 304. Cover plate 306 is adapted to receive die 302 and is attached to upper platen 308. Support plate 310 is adapted receive die 304 and is attached to lower platen 312. Skirt 314 of cover plate 306 is adapted to matingly receive support plate 310. Cooperating surfaces of cover plate 306 and support plate 310 define embossing chamber 316.

In operation, the expanded graphite sheet rests on die 304 and upper platen 308 urges cover plate 306 towards support plate 310. Cylindrical sleeve 318 receives guide pillar 320, thereby facilitating proper alignment of the components of apparatus 300 during embossing. O-ring 322 forms a substantially gas-tight seal between skirt 314 and support plate 310. At least a portion of the air (or other gas) within embossing chamber 316 is withdrawn via port 324 by a pump (not shown), thereby reducing the pressure in embossing chamber 316 below atmospheric pressure. Dies 302 and 304 are then further urged towards each other, bringing them in contact with the expanded graphite sheet and embossing it. Reduced pressure within embossing chamber 316 is maintained during the embossing process. Once embossing is complete the pressure within embossing chamber 316 is allowed to return to atmospheric pressure, cover plate 306 is disengaged from support plate 310, and the embossed expanded graphite sheet can be removed.

Figure 4A:
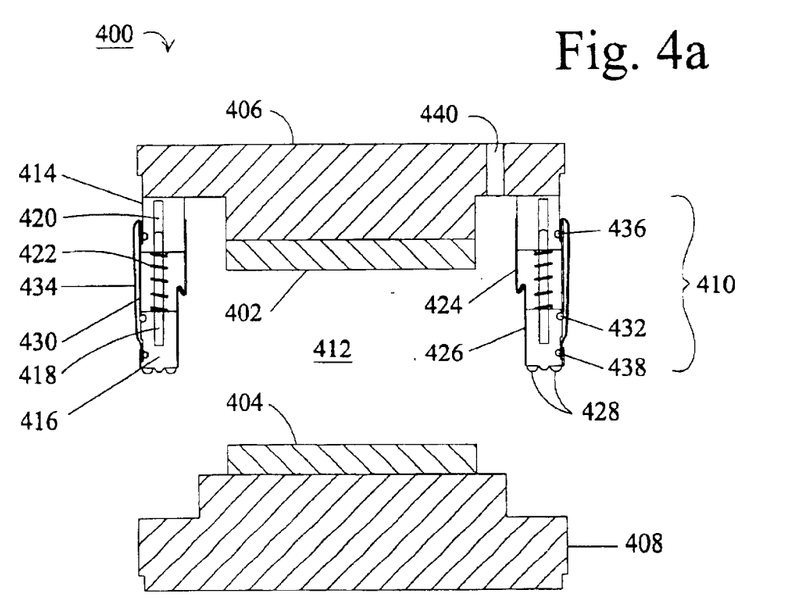
FIGS. 4a and 4b are sectional views of yet another embodiment of the present embossing apparatus.
Figure 4B:
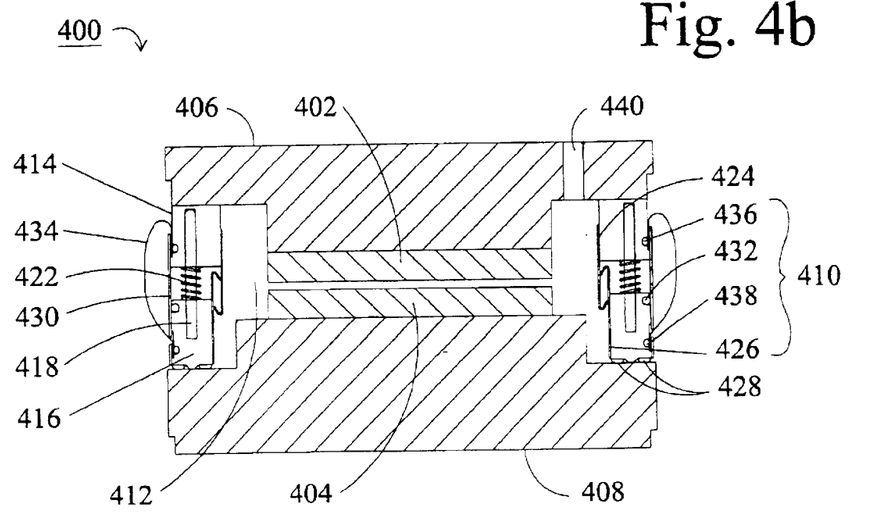

FIGS. 4a and 4b are sectional views of yet another embodiment of the present embossing apparatus. In embossing apparatus 400, an expanded graphite sheet (not shown) is placed between dies 402 and 404. Cover plate 406 and support plate 408 are adapted to receive dies 402 and 404, respectively. Cover plate 406 and support plate 408 are also attached to respective upper and lower platens (not shown). Compressible seal 410 is connected to the perimeter of cover plate 406. Cooperating surfaces of cover plate 406, support plate 408, and compressible seal 410 define embossing chamber 412, as best shown in FIG. 4b.

Compressible seal 410 comprises upper fixture 414 and lower fixture 416. Guide pin 418 is connected to lower fixture 416 and slidingly engages sleeve 420 of upper fixture 414. Spring 422 applies a force separating upper and lower fixtures 414, 416. As shown in FIG. 4a, when apparatus 400 is in the open position, retaining clips 424, 426 prevent upper and lower fixtures 414, 416 from separating.

In operation, cover plate 406 is urged towards support plate 408 and compressible seal 410 makes contact therewith. Resilient face seals 428 form a substantially gas-tight seal between lower fixture 416 and support plate 408. As cover plate 406 is further urged towards support plate 408, spring 422 is compressed and sliding seal ring 430, which is connected to upper fixture 414, matingly slides past lower fixture 416 (see FIG. 4b). O-ring 432 forms a substantially gas-tight seal therebetween. Boot 434 is attached to upper and lower fixtures 414, 416, and O-rings 436 and 438 form substantially gas-tight seals between boot 434 and upper and lower fixtures 414, 416, respectively. Boot 434 is provided as a back-up to the seal provided by seal ring 430 and O-ring 432. However, boot 434 may be omitted, if desired, provided that a suitable seal can be maintained in its absence. At least a portion of the air (or other gas) within embossing chamber 412 is withdrawn via port 440 by a pump (not shown), thereby reducing the pressure in embossing chamber 412 below atmospheric pressure. Cover plate 406 is then further urged towards support plate 408, bringing dies 402 and 404 in contact with the graphite sheet and embossing it. Reduced pressure within embossing chamber 412 is maintained during the embossing process. Once embossing is complete the pressure within embossing chamber 412 is allowed to return to atmospheric pressure, cover plate 406 is disengaged from support plate 408, and the embossed expanded graphite sheet can be removed. The design of compressible seal 410 is not essential to the present apparatus, and other suitable designs may be employed. For example, an elastomeric seal may be used depending on the specifications of the apparatus, provided a gas-tight seal within embossing chamber 412 can be maintained.

Figure 5:
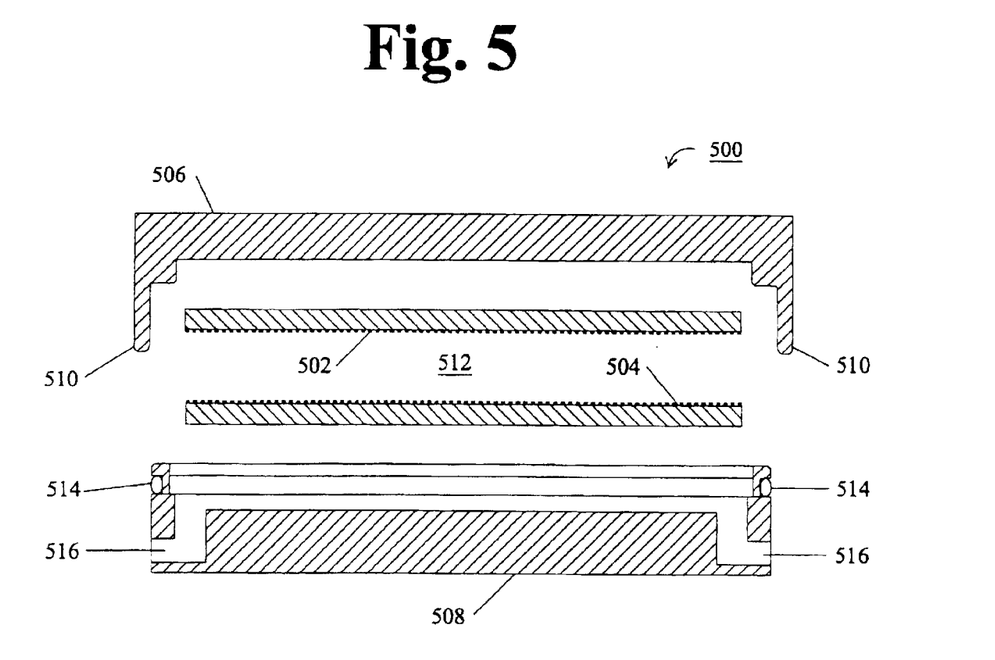
FIG. 5 is a partially exploded cross-sectional view of a further embodiment of the present embossing apparatus.

FIG. 5 is a partially exploded cross sectional view of a further embodiment of the present embossing apparatus. In embossing apparatus 500, an expanded graphite sheet (not shown) is placed between dies 502 and 504. Cover plate 506 and support plate 508 are adapted to receive dies 502 and 504, respectively. Cover plate 506 and support plate 508 are also attached to respective upper and lower platens (not shown). Skirt 510 of cover plate 506 is adapted to matingly receive support plate 508. Cooperating surfaces of cover plate 506 and support plate 508 define embossing chamber 512.

In operation, the expanded graphite sheet rests on die 504 and cover plate 506 is urged towards support plate 508. O-ring 514 forms a substantially gas-tight seal between skirt 510 and support plate 508. At least a portion of the air (or other gas) within embossing chamber 512 is withdrawn via ports 516 spaced around the perimeter of the apparatus 500 by a pump (not shown), thereby reducing the pressure in embossing chamber 512 below atmospheric pressure. Dies 502 and 504 are then further urged towards each other, bringing them in contact with the expanded graphite sheet and embossing it. Reduced pressure within embossing chamber 512 is maintained during the embossing process. Once embossing is complete the pressure within embossing chamber 512 is allowed to return to atmospheric pressure, cover plate 506 is disengaged from support plate 508, and the embossed expanded graphite sheet can be removed.

Figure 6A:
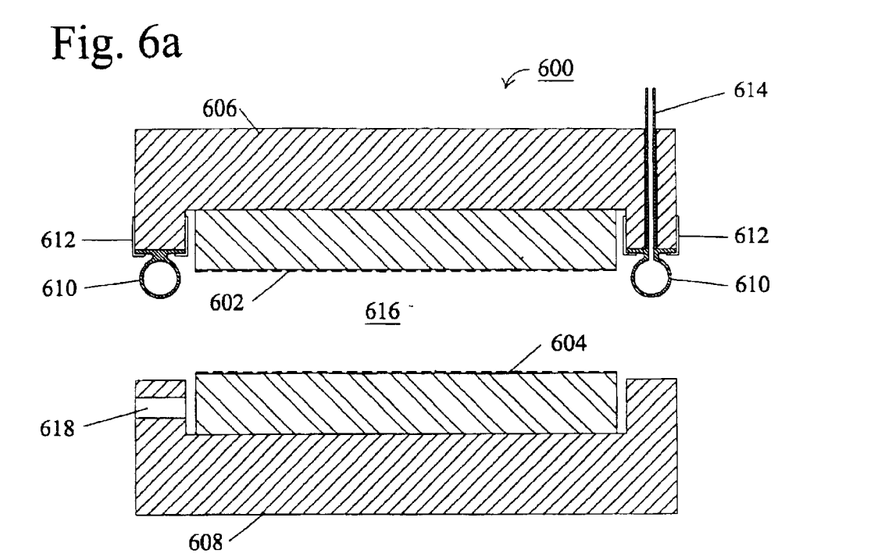
FIGS. 6a and 6b are cross-sectional views of a further embodiment of the present apparatus.
Figure 6B:
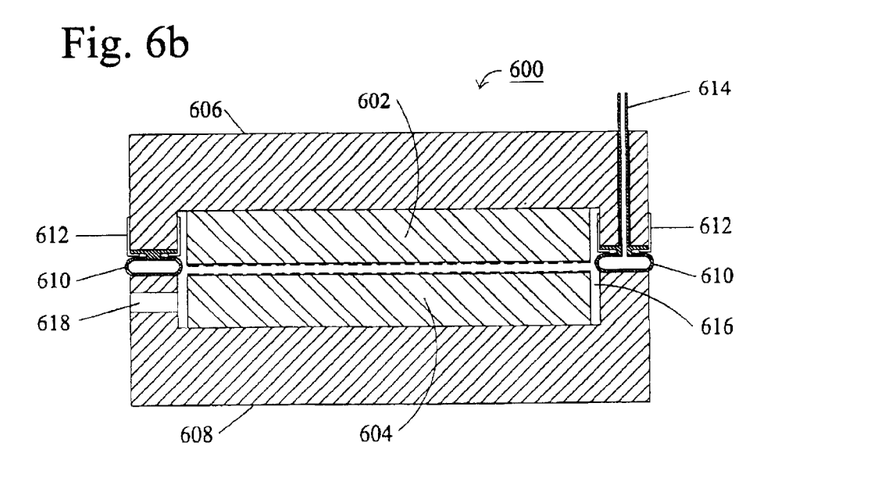

FIGS. 6a and 6b are cross sectional views of a further embodiment of the present apparatus. In embossing apparatus 600, an expanded graphite sheet (not shown) is placed between dies 602 and 604. Cover plate 606 and support plate 608 are adapted to receive dies 602 and 604, respectively. Cover plate 606 and support plate 608 are also attached to respective upper and lower platens (not shown). Inflatable bladder 610 is fixed to cover plate 606. Bladder clamps 612 assist in fixing bladder 610 to cover plate 606. Air (or other gas) can be introduced and removed from bladder 610 via aperture 614, which allows the pressure within bladder 610 to be controlled manually by the operator or by an automated controller. The cooperating surfaces of cover plate 606, support plate 608, and bladder 610 comprise embossing chamber 616.

In operation, the expanded graphite sheet rests on die 604 and cover plate 606 is urged towards support plate 608. Bladder 610 is inflated to a suitable pressure for forming a substantially gas-tight seal between cover plate 606 and support plate 608, as shown in FIG. 6b. Alternatively, bladder 610 could be replaced by a compressible seal, so long as an gas-tight seal could be formed between cover plate 606 and support plate 608. At least a portion of the air (or other gas) within embossing chamber 616 is withdrawn via port 618 by a pump (not shown), thereby reducing the pressure in embossing chamber 616 below atmospheric pressure. Dies 602 and 604 are then further urged towards each other, bringing them in contact with the expanded graphite sheet and embossing it. Reduced pressure within embossing chamber 616 is maintained during the embossing process. Once embossing is complete the pressure within embossing chamber 616 is allowed to return to atmospheric pressure, cover plate 606 is disengaged from support plate 608, and the embossed expanded graphite sheet can be removed.

While the foregoing embodiments have been illustrated employing press platens to emboss the expanded graphite sheet material, other methods of embossing could also be used. For example, one of the plate dies in any of the embodiments of FIGS. 3–6 could be replaced with a roller die. A roller may be used to press the sheet material against a die and may also have die features on its surface. The press platen embodiment is preferred, however.

Similarly, although the foregoing embodiments have been illustrated employing vacuum ports for withdrawing at least a portion of the embossing atmosphere from the embossing chamber the present method and apparatus are not limited to such ports. For example, the lower die, support for the die, or both, may be porous and at least a portion of the embossing atmosphere could be withdrawn through the porous part. Porous parts, such as those made from aluminum foam, for example, are known to those skilled in the art. The use of vacuum ports as described, however, is preferred.

As used in this description and in the appended claims, "substantially gas-tight" does not necessarily mean hermetically sealed. In this regard, generally, substantially gas-tight conditions are achieved so long as the inflow of air (or other gas) is restricted such that the pressure within the chamber is maintained at a pressure below atmospheric pressure during embossing.

The present method and apparatus also allows for control of the localized atmosphere during embossing. For example, the foregoing embodiments of the present apparatus may further comprise an inert gas source for supplying an inert gas (for example, nitrogen) to the embossing chamber prior to reducing the gas pressure therein. An inert atmosphere may be desirable in certain applications where oxidizing conditions, for example, may be detrimental during embossing and/or lamination. Where it is desired to control the localized embossing atmosphere in this manner, it is also desirable for the substantially gas-tight embossing chamber to be substantially hermetically sealed during embossing.

Further, the foregoing embodiments of the present apparatus allow for the removal of any gases or vapors that may be liberated during the embossing/lamination process from the embossing chamber. Hazardous gases or vapors may be captured, stored and disposed of in a safe manner. For example, the apparatus may further comprise a filter between the vacuum port(s) and the pump to collect and filter any noxious gases. Alternatively, a positive pressure differential could be established in the embossing chamber after embossing for removing any noxious gases to a filter or other suitable capture means. As a further alternative, such gases may be vented to the environment, if appropriate. Other methods of safely removing noxious gases will be apparent to those skilled in the art.

In all of the foregoing embodiments, a reduced pressure within the embossing chamber is preferably maintained during the embossing process. Once embossing is complete the pressure within embossing chamber is allowed to return to atmospheric pressure, the embossing components are disengaged, and the embossed expanded graphite sheet can be removed. By maintaining a reduced pressure in the embossing chamber, the amount of gas trapped within the expanded graphite sheet is reduced, generally preventing the formation of large blisters therein that may make the embossed material unsuitable for a given application. For example, where embossed expanded graphite sheets are used as flow field plates in fuel cell applications, large blisters are undesirable for several reasons. For example, large blisters may structurally weaken the plate, produce irregular surface characteristics or interfere with the desired flow path embossed in the plate. Alternatively, where the embossed sheet is subsequently impregnated with an impregnant (for example, a resin) to improve impermeability, the presence of large blisters may lead to pockets of solid impregnant within the expanded graphite matrix of the plate. This may result in irregular conductivity through the plate. As a further example, the presence of large blisters may lead to delamination of laminated expanded graphite sheets.

The pressure within the embossing chamber determines, in part, the time required for embossing expanded graphite sheets so as to avoid blistering. Generally, the higher the pressure within the embossing chamber, the more slowly embossing should be performed in order to avoid trapping gas within the sheets and prevent blistering, and the lower the part yield for the process. Preferably, the pressure within the embossing chamber is less than or equal to about 400 torr during the embossing process. More preferably the pressure is less than 350 torr. More preferably still, the pressure within the embossing chamber is less than 170 torr and even more preferably less than 50 torr.

The foregoing embodiments employ an embossing chamber for embossing expanded graphite sheet material wherein the pressure within the embossing chamber is maintained at a pressure less than atmospheric pressure at least during the embossing step. The inventors have also discovered that it is possible to remove at least a portion of the gas within the expanded graphite sheet material by placing it in a chamber at a pressure less than atmospheric pressure and subsequently embossing the sheet material at atmospheric pressure.

Once at least a portion of the gas within the expanded graphite sheet material has been removed at reduced pressure, exposing the sheet material to atmospheric pressure allows gas to re-enter. Again, without being restricted to any particular theory, it is thought that the anisotropy of expanded graphite sheet material also restricts the flow of gas into the sheet material essentially from the edges thereof. So long as the expanded graphite sheet material is embossed before an amount of gas sufficient to cause significant blistering or delamination is reintroduced into the sheet material, embossing may occur at atmospheric pressure without adversely affecting the quality of the embossed product.

Figure 7A:
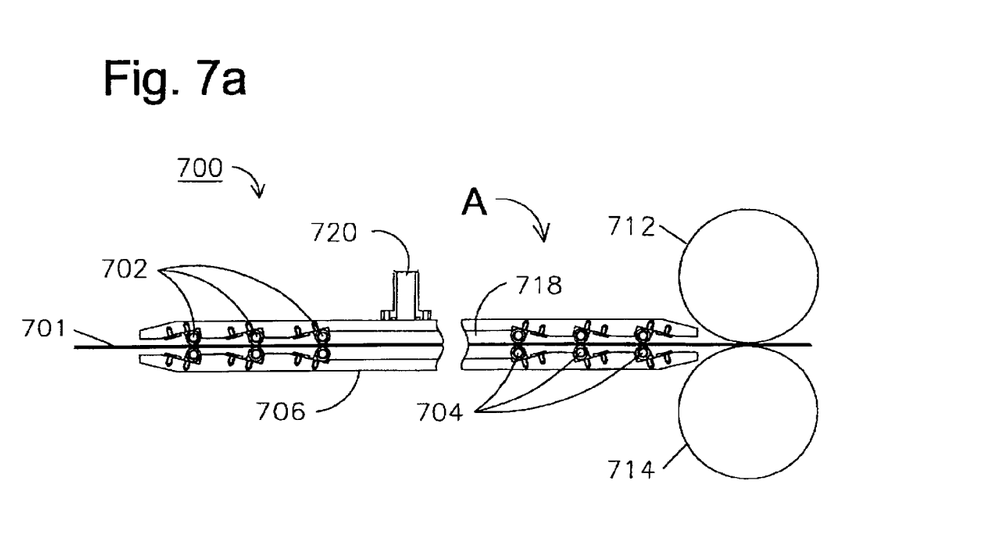
FIG. 7a is a cross-sectional view of another embodiment of the present apparatus.
Figure 7B:
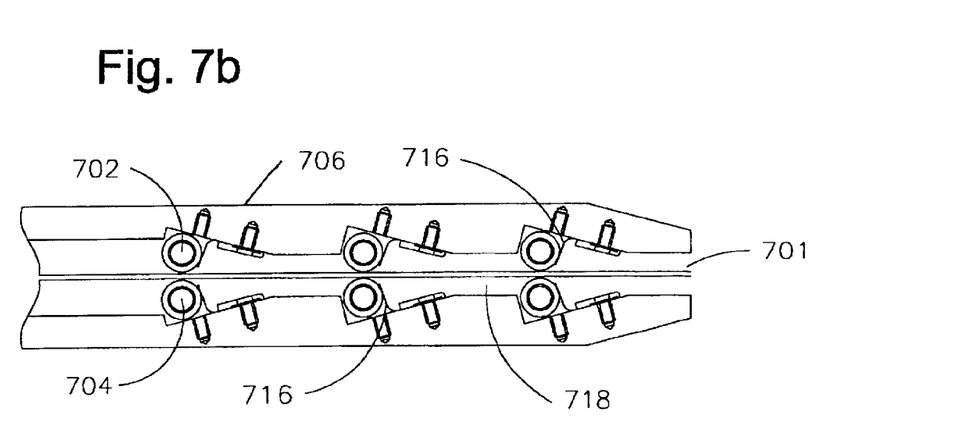
FIG. 7b is a cross-sectional view of the portion of the apparatus of FIG. 7a designated as A.
Figure 7C:
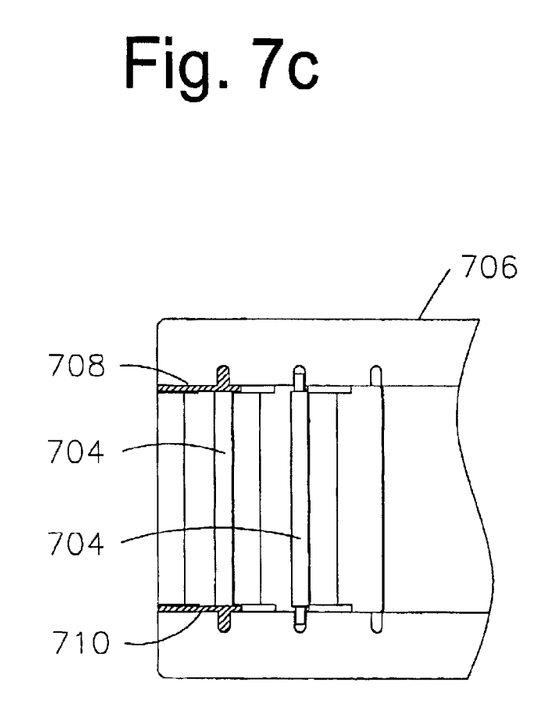
FIG. 7c is a top view of the bottom half of the portion of the apparatus of FIG. 7a designated as A.
Figure 7D:
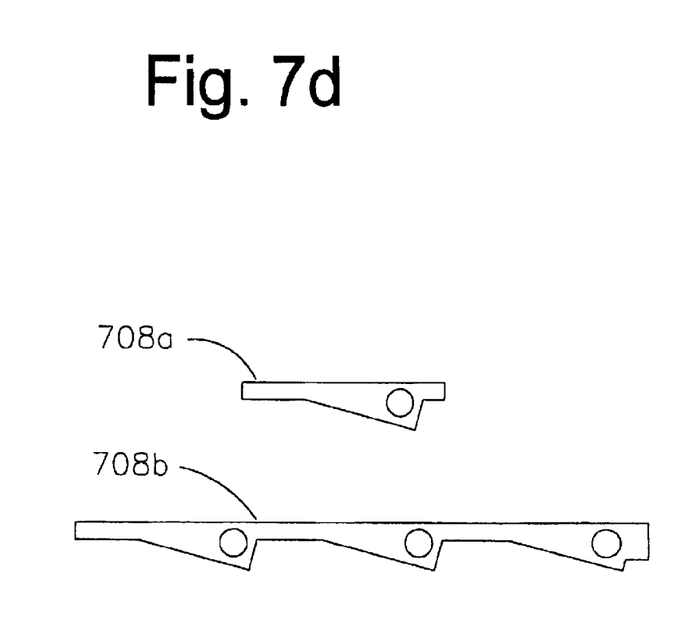

FIG. 7a is a cross-sectional view of another embodiment of the present apparatus. FIG. 7b is a cross-sectional view of the portion of the apparatus of FIG. 7a designated as A. FIG. 7c is a top view of the bottom half of the portion of the apparatus of FIG. 7a designated as A, and FIG. 7d is a side view of two embodiments of the seals discussed below.

In embossing apparatus 700, expanded graphite sheet 701 is directed between rollers 702 and 704 in housing 706. Embossing apparatus 700 may further comprise seals 708 and 710 (not shown in FIGS. 7a or 7b; see FIGS. 7c and 7d) to provide a substantially gas-tight seal between the ends of rollers 702, 704 and the adjacent portions of housing 706. FIG. 7c illustrates two rollers 704 positioned in housing 706, one with seals 708, 710 in place, and one without any seals. The shape of seals 708, 710 are not a critical feature of the present apparatus. In this regard, the seals may be any suitable shape so long as they are capable of forming a substantially gas-tight seal at the ends of the rollers. Seals 708 may be formed individually, such as seal 708a in FIG. 7d and seal 708 in FIG. 7c, or they may form a integrated sealing member, such as seal 708b in FIG. 7d, if desired. Of course, the same considerations apply for seals 710. Seals may be used with one or more of the rollers within housing 706, as desired.

The embodiment of the present apparatus may further comprise roller seals 716, which are adapted to contact the cylindrical surface of rollers 702, 704 and provide a substantially gas-tight seal therebetween. Roller seals 716 may comprise any suitable resilient, low-friction material capable of providing a substantially gas-tight seal, such as brass or Teflon™ (W. L. Gore & Associates, Inc., Elkton, Md., USA) sheet, for example. While FIGS. 7a and 7b show each of rollers 702, 704 having an associated roller seal 716, this is not required. The apparatus may not comprise roller seals, or may have roller seals associated with some or all of the rollers.

In operation, expanded graphite sheet 701 is directed to rollers 702, 704. The surfaces of rollers 702, 704 in contact with sheet 701, and (optionally) seals 708, 710, and roller seals 716, cooperate to form a substantially gas-tight seal within chamber 718. At least a portion of the gas within chamber 718 is withdrawn via port 720 by a pump (not shown), thereby reducing the pressure in chamber 718 below atmospheric pressure. Reducing the pressure within chamber 718 below atmospheric pressure removes a portion of the gas within the interior of expanded graphite sheet 701. The portion of expanded graphite sheet 701 exiting chamber 718 is directed to embossing dies 712, 714, which contact expanded graphite sheet 701 and emboss it.

Although FIGS. 7a–7c illustrate embossing apparatus 700 as having more than two pairs of opposed rollers 702, 704, this configuration is not required to form a chamber capable of maintaining a substantially gas-tight seal. For example, such a chamber may be formed by only two pairs of rollers 702, 704. Alternatively, either set of rollers 702 or 704 could be replaced by a substantially flat, smooth surface, in which case a suitable chamber may be formed by two rollers (for example, two rollers 702, or two rollers 704) opposed to the smooth surface.

The present embodiment may further comprise feed rollers associated with housing 706 for directing expanded graphite sheet material 701 into housing 706 and to roller dies 712, 714. Alternatively, at least one of rollers 702, 704 may be driven.

The cylindrical surfaces of the rollers may comprise a material that assists in providing a seal between the roller and the expanded graphite sheet material. For example, the cylindrical surface of the roller may comprise a resilient material, such as urethane, that may assist in sealing.

Figure 8:
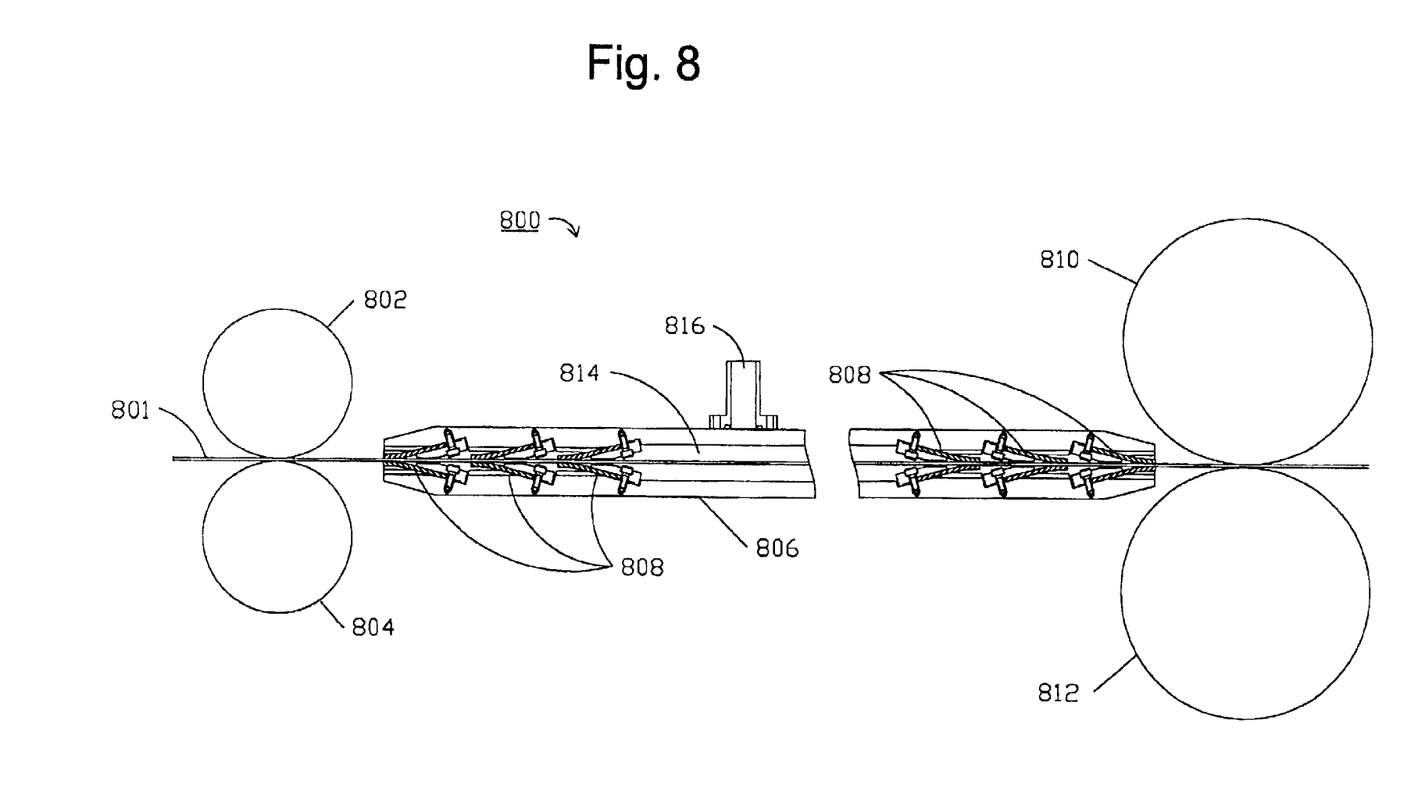
FIG. 8 is a cross-sectional view of another embodiment of the present apparatus.

FIG. 8 is a cross-sectional view of another embodiment of the present apparatus. In embossing apparatus 800, expanded graphite sheet 801 is directed between feed rollers 802 and 804 and into housing 806. Resilient members 808 contact expanded graphite sheet 801 and provide a substantially gas-tight seal therebetween. Adjacent housing 806 are roller dies 810 and 812, respectively.

In operation, expanded graphite sheet 801 is directed by feed rollers 802, 804 to housing 806. Resilient members 808 in contact with sheet 801 cooperate to form a substantially gas-tight seal within chamber 814 of housing 806. At least a portion of the gas within chamber 814 is withdrawn via port 816 by a pump (not shown), thereby reducing the pressure in chamber 814 below atmospheric pressure. Reducing the pressure within chamber 814 below atmospheric pressure removes a portion of the gas within the interior of expanded graphite sheet 801. The portion of expanded graphite sheet 801 exiting housing 806 is directed to roller dies 810, 812 and embossed.

Figure 9:
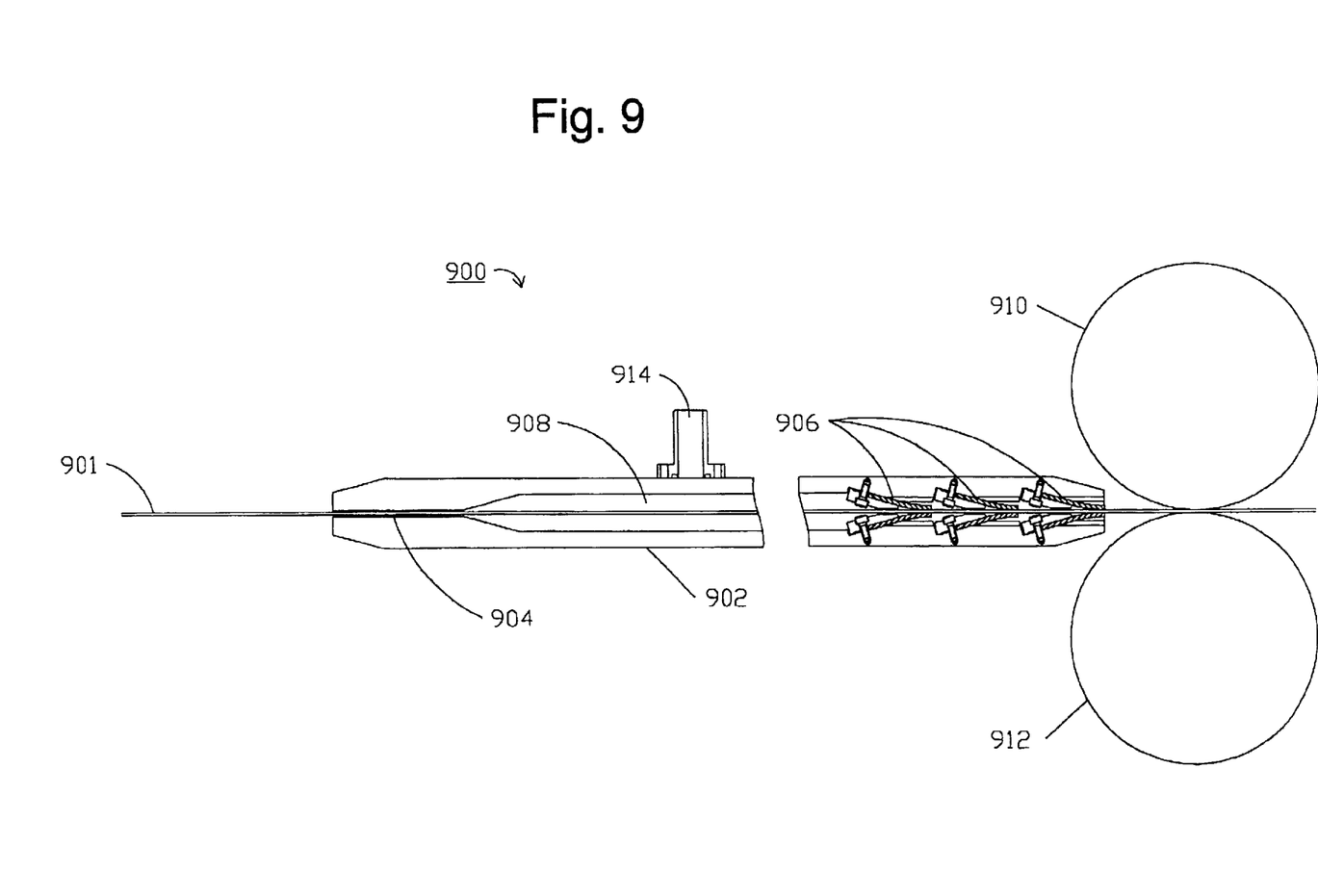
FIG. 9 is a cross-sectional view of another embodiment of the present apparatus.

FIG. 9 is a cross-sectional view of another embodiment of the present apparatus. In embossing apparatus 900, expanded graphite sheet 901 is directed into housing 902 via constriction 904. If desired, apparatus 900 may comprise one or more feed rollers for directing expanded graphite sheet 901 into housing 902. Resilient members 906 located within chamber 908 contact expanded graphite sheet 901 and provide a substantially gas-tight seal therebetween. Adjacent housing 902 are roller dies 910 and 912, respectively.

In operation, expanded graphite sheet 901 is directed to constriction 904 in housing 902. Constriction 904 is sized so as to permit free movement of expanded graphite sheet 901, but to restrict the free movement of air between housing 902 and expanded graphite sheet 901. Resilient members 906 in contact with sheet 901 cooperate to form a substantially gas-tight seal therebetween. At least a portion of the gas within chamber 908 is withdrawn via port 914 by a pump (not shown). Constriction 904 restricts the inflow of air (or other gas) into chamber 908 from outside housing 902 such that the pump is able to reduce the pressure in chamber 908 below atmospheric pressure. Reducing the pressure within chamber 908 below atmospheric pressure removes a portion of the gas within the interior of expanded graphite sheet 901. The portion of expanded graphite sheet 901 exiting housing 902 is directed to roller dies 910, 912 and embossed.

In an alternative embodiment, apparatus 900 may comprise at least one set of roller dies, such as illustrated in FIG. 7a or 7b, instead of resilient members 906. Further, one or more of the rollers may be replaced by roller dies, thereby eliminating the need for separate roller dies 910, 912.

Although FIGS. 8 and 9 illustrate embossing apparatus having more than two pairs of resilient members, this configuration is not required to form a chamber capable of maintaining a substantially gas-tight seal. For example, such a chamber may be formed by only one pair of resilient members. Alternatively, either of the pair of opposed resilient members could be replaced by a substantially flat, smooth surface, in which case a suitable chamber may be formed by a single resilient member opposed to the smooth surface. Multiple resilient members may provide a better or more reliable seal.

In the embodiments of the present apparatus shown in FIGS. 7a, 8 and 9, a pair of roller dies is illustrated. This allows for embossing of both major surfaces of the expanded graphite sheet. Alternatively, one of the pair of roller dies may be replaced with a substantially smooth roller, if it is desired to emboss features on one side only of the expanded graphite sheet material. Alternatively, one of the pair of roller dies may be eliminated and the expanded graphite sheet may be supported on a relatively flat surface during embossing by a single roller die.

As a further alternative, in the embodiment of the present apparatus shown in FIG. 7a one of rollers 702, 704, or a pair of rollers 702, 704 could be replaced by one or a pair of roller dies, respectively. For example, the last pair of rollers 702, 704 that come in contact with expanded graphite sheet material 701 may be replaced by roller dies for embossing the material. In this manner, separate roller dies 712, 714 could be omitted.

In the embodiments of the present apparatus shown in FIGS. 7a, 8 and 9, the expanded graphite sheet material is preferably embossed before an amount of gas sufficient to cause significant blistering or delamination is re-introduced into the sheet material. The amount of gas that can be re-introduced into the expanded graphite sheet material before significant blistering or delamination may result in the embossed sheet depends on the amount of gas within the sheet as it exits the chamber. This amount of gas within the expanded graphite sheet depends, in part, on the pressure within the chamber. Generally, the higher the pressure within the embossing chamber, the less gas that may be re-introduced into the expanded graphite sheet material prior to embossing without negatively impacting on the embossed product. Preferably, the pressure within the chamber is less than or equal to about 400 torr, more preferably less than 350 torr. More preferably still, the pressure within the chamber is less than 170 torr and even more preferably less than 50 torr.

The rate at which gas is re-introduced into the expanded graphite sheet material depends on the thickness of the sheet, the grade (composition) of the sheet, the speed at which the sheet is passed through the apparatus, and the distance between the chamber and the nip of the roller dies. Both the amount of gas within the expanded graphite sheet material, and the rate of re-introduction of gas into the sheet material, affect the amount of gas present in the sheet material during embossing.

Thus, the pressure within the chamber, the speed with which the expanded graphite sheet material is passed through the apparatus, and the distance between the chamber and the nip of the roller dies may be controlled for a given thickness and grade of expanded graphite sheet material to minimize re-introduction of gas into the sheet material that may cause blistering or delamination in the embossed sheet. The particular combination of parameters for a given grade and thickness of expanded graphite sheet material may be empirically determined by persons skilled in the art.

The embodiments of the present apparatus shown in FIGS. 7a, 8, and 9 are suitable for embossing batches of expanded graphite sheets, and are particularly suited for continuous embossing of expanded graphite sheet material. For example, the embodiments may be used for continuous embossing of rolls of expanded graphite sheet material to produce fluid flow field plates. After embossing, the expanded graphite sheet may be crosscut to separate the plates thus formed.

The present method and apparatus may be used to emboss features on one or both major surfaces of an expanded graphite sheet. The features embossed on both major surfaces of the sheet may be the same or different. For example, flow channels may be embossed on both major surfaces of an expanded graphite sheet to produce what is commonly referred to as a bipolar plate. The flow channels may have the same or different dimensions and/or orientations.

The present apparatus can also be used to emboss a laminate comprising one or more expanded graphite sheets laminated together, optionally with other materials. It may also be used to perform the lamination concurrently with embossing, depending on the compatibility of the laminating medium with the components of the apparatus.

In all of the foregoing embodiments, the surface of the expanded graphite sheet may be punctured to enhance to removal of gas during the embossing process, if desired. For example, a pin roller may be employed to puncture the surface of the expanded graphite sheet. This may be done manually, or a mechanism for puncturing the expanded graphite sheet may be incorporated into the present apparatus. For example, the embodiments of the present apparatus shown in FIGS. 7a, 8, and 9 may further comprise a pin roller for directing the expanded graphite sheet to the housing. The pin roller may also be employed to puncture the surface of the expanded graphite sheet to enhance removal of gas during the embossing process. Alternatively, an opposed pair of pin rollers may be employed, where one or both pin rollers also punctures the surface of the expanded graphite sheet. Increasing the depth of penetration into the expanded graphite sheet by the puncturing mechanism tends to decrease blister formation during embossing. Conversely, penetrating too deeply into the expanded graphite sheet may have an undesirable effect on the appearance or structural integrity of the resulting embossed product. The appropriate degree of penetration depends on the thickness of the expanded graphite sheet material, the grade (composition) of the sheet material, post-embossing processing, and the end use of the embossed sheet material, for example. Thus, care should be taken to empirically determine an adequate degree of penetration where puncturing of the expanded graphite sheet is employed.

Where the present method and apparatus are employed to produce fluid flow field plates, for example, the die(s) may incorporate multiple plate patterns. For example, roller dies may incorporate multiple plate patterns so that each embossing step produces more than one plate. Parallel processing of multiple plates per embossing step may result in a decreased manufacturing cycle time for the parts.

While particular elements, embodiments and applications of the present invention have been shown and described, it will be understood, of course, that the invention is not limited thereto since modifications may be made by those skilled in the art, particularly in light of the foregoing teachings. It is therefore contemplated by the appended claims to cover such modifications that incorporate those features coming within the scope of the invention.

What is claimed is:

1. A method of embossing expanded graphite sheet material comprising:
    embossing said expanded graphite sheet material in an embossing atmosphere at a reduced pressure less than atmospheric pressure; and
    maintaining said reduced pressure at least during the embossing step,
    whereby gas trapped within said expanded graphite sheet is removed by said reduced pressure during the embossing step.

2. The method of claim 1 further comprising continuing to evacuate gases from said embossing atmosphere during said embossing step.

3. The method of claim 1, further comprising puncturing at least one surface of said material prior to embossing said material.

4. The method of claim 1 wherein said reduced pressure is less than or equal to about 400 torr.

5. The method of claim 1 wherein said reduced pressure is less than or equal to about 350 torr.

6. The method of claim 1 wherein said reduced pressure is less than or equal to about 170 torr.

7. The method of claim 1 wherein said reduced pressure is less than or equal to about 50 torr.

8. The method of claim 1 wherein said material comprises a plurality of sheet materials comprising at least one expanded graphite sheet, and the method further comprising laminating said plurality of sheet materials during said embossing step.

9. The method of claim 8 wherein said plurality of sheet materials comprises at least one sheet of metal foil.

10. The method of claim 1 wherein said embossing atmosphere is an inert gas.

11. The method of claim 10 wherein said inert gas is selected from the group consisting of nitrogen, helium and argon.

12. The method of claim 11 wherein said inert gas is substantially pure nitrogen.

13. A method of embossing expanded graphite sheet material comprising:
    removing at least a portion of the gas from within said expanded graphite sheet material by exposing said material to a pressure less than atmospheric pressure;
    embossing said expanded graphite sheet material in an embossing atmosphere at a reduced pressure less than atmospheric pressure; and
    maintaining said reduced pressure at least during the embossing step,
    wherein gas trapped within said expanded graphite sheet is removed by said reduced pressure during the embossing step.

14. The method of claim 13, further comprising puncturing at least one surface of said material prior to exposing said material to said pressure less than atmospheric pressure.

15. The method of claim 13 wherein said reduced pressure is less than or equal to about 400 torr.

16. The method of claim 13 wherein said reduced pressure is less than or equal to about 350 torr.

17. The method of claim 13 wherein said reduced pressure is less than or equal to about 170 torr.

18. The method of claim 13 wherein said reduced pressure is less than or equal to about 50 torr.

19. The method of claim 13 wherein said material comprises a plurality of sheet materials comprising at least one expanded graphite sheet, and the method further comprising laminating said plurality of sheet materials during said embossing step.

20. The method of claim 19 wherein said plurality of sheet materials comprises at least one sheet of metal foil.

* * * * *

UNITED STATES PATENT AND TRADEMARK OFFICE
CERTIFICATE OF CORRECTION

PATENT NO.    : 6,797,091 B2
DATED         : September 28, 2004
INVENTOR(S)   : Donald A. Lines et al.

It is certified that error appears in the above-identified patent and that said Letters Patent is hereby corrected as shown below:

<u>Title page,</u>
Item [75], Inventors, change "Nicholas A. Fletcher" to -- Nicholas J. Fletcher --.

Signed and Sealed this

Eighteenth Day of January, 2005

JON W. DUDAS
*Director of the United States Patent and Trademark Office*